Patented June 15, 1926.

1,588,451

UNITED STATES PATENT OFFICE.

WILHELM ECKERT AND HEINRICH GREUNE, OF HOCHST-ON-THE-MAIN, GERMANY.

VAT DYESTUFF AND PROCESS OF MAKING SAME. REISSUED

No Drawing. Application filed July 17, 1925, Serial No. 44,369, and in Germany July 21, 1924.

We have found that new valuable vat dyestuffs are obtained by condensing the dianhydride of 1.4.5.8-naphthalenetetracarbolyxic acid, or this acid itself or its substitution products, with an ortho-diamine or a salt of it. The new dyestuffs are distinguished by the beautiful shades they give and their excellent properties as to fastness.

It could not be expected that vat-dyestuffs are obtained by means of naphthalenetetracarboxylic acid, because the 1.4.5.8-naphthalenetetracarboxylic acid used as parent product is a perfectly white body to which, even if it is transformed into the di-imide, cannot be imparted the characteristic properties of a dyestuff.

The following example illustrates our invention the parts being by weight:

10 parts of the dianhydride of the 1.4.5.8-naphthalenetetracarboxylic acid are heated in 50 parts of nitrobenzene with 20 parts of ortho-phenylenediamine until the product resulting from the reaction is entirely separated. This product is filtered off by suction and washed with alcohol until the excess of ortho-phenylenediamine is entirely eliminated. The new dystuff forms, when dry, a bright red powder which dissolves in concentrated sulfuric acid to a yellowish-brown solution. It gives a green vat which dyes cotton the same color which, when the material is exposed to the air, changes to a brilliant red tint with a yellow hue.

If for the ortho-phenylenediamine is substituted 4-chloro-1.2-diaminobenzene and the further operations are carried out as above indicated, a dyestuff is obtained which dyes cotton from a green vat a green tint which, when the material is exposed to the air, changes to a bright reddish brown shade of excellent fastness.

From 4-nitro-1.2-diaminobenzene and 1.4.5.8-napthalenetetracarboxylic acid or its anhydride a dyestuff is obtained as a brown powder, which dissolves in concentrated sulfuric acid to a yellow solution with an intense green fluorescence. The vat prepared therefrom is of a green color and dyes cotton the same color which, when the material is exposed to the air, changes to a grey to black tint.

In the same manner there may be condensed instead of the bases themselves their salts, particularly the hydrochlorides, with naphthalene-1.4.5.8-tetracarboxylic acid or its anhydride.

Instead of condensing a naphthalene-1.4.5.8-tetracarboxylic acid halogenated or not, with a halogenated ortho-phenylenediamine substituted or not, the finally formed condensation products partially containing or not containing halogen, may afterwards be halogenated. This halogenation may be effected by suspending the condensation product in a diluent, such as nitrobenzene, and introducing for instance a gentle current of chlorine into the mass, while heating to about 160–180° C. Finally the mass is isolated in the usual manner.

The chlorinated product thus obtained dissolves in concentrated sulfuric acid with a red color and dyes cotton from a green vat a reddish-brown tint.

As the 1.4.5.8-naphthalenetetracarboxylic acid reacts in essentially the same manner as the anhydride, we understand by the term " 1.4.5.8-naphthalenetetracarboxylic acid", used in the following claims, not only this acid itself but also its anhydride, and by "an ortho-diamine" we understand also the salts of it.

The condensation may also be effected in absence of a solvent or diluent with the same result by melting together for a short time both components.

We claim:

1. Process of preparing vat dyestuffs, consisting in condensing a 1.4.5.8-naphthalenetetracarboxylic acid with an ortho-diamine.

2. Process of preparing vat dyestuffs, consisting in condensing a 1.4.5.8-naphthalenetetracarboxylic acid with an ortho-diamine in presence of diluents.

3. Process of preparing vat dyestuffs, consisting in condensing 1.4.5.8-naphthalene-tetracarboxylic acid with a nitrated 1.2-diaminobenzene.

4. Process of preparing vat dyestuffs, consisting in condensing a 1.4.5.8-naphthalenetetracarboxylic acid with an ortho-diamine and halogenating the condensation product.

5. As new products, the vat dyestuffs of the following composition:

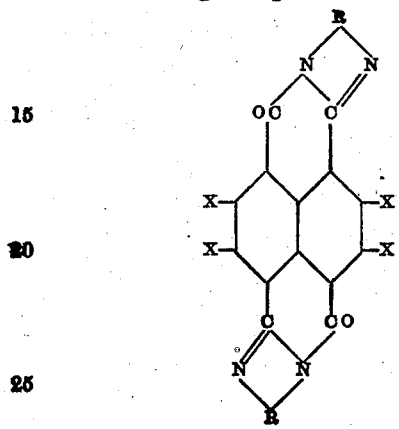

or

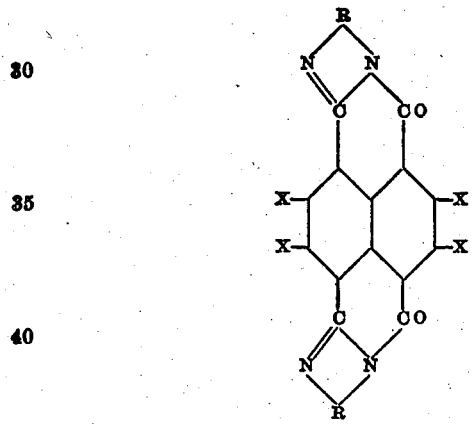

wherein X represents hydrogen or any substituent and R a hydrocarbon substituted or not.

6. As a new product, the vat dyestuff of the following formula:

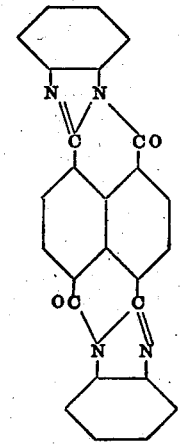

or

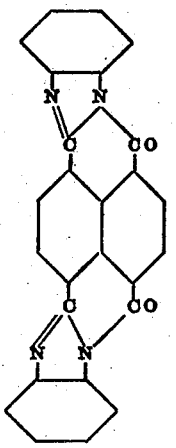

being a red powder, soluble in concentrated sulfuric acid with a yellowish-brown color, giving a green vat, from which cotton is dyed after exposure to the air a brilliant yellowish-red.

In testimony whereof, we affix our signatures.

Dr. WILHELM ECKERT.
Dr. HEINR. GREUNE.